US006674019B2

(12) United States Patent
Oldendorf et al.

(10) Patent No.: US 6,674,019 B2
(45) Date of Patent: Jan. 6, 2004

(54) DISPLAY AND OPERATING ELEMENT FOR AN ELECTRONIC SCALE

(75) Inventors: Christian Oldendorf, Goettingen (DE); Rolf Dix, Noerten-Hardenberg (DE); Axel Taube, Goettingen (DE)

(73) Assignee: Sartorius Aktiengesellschaft, Goettingen (DE)

( * ) Notice: Subject to any disclaimer, the term of this patent is extended or adjusted under 35 U.S.C. 154(b) by 318 days.

(21) Appl. No.: 09/824,658

(22) Filed: Apr. 4, 2001

(65) Prior Publication Data

US 2002/0074170 A1 Jun. 20, 2002

(30) Foreign Application Priority Data

Dec. 20, 2000 (DE) .......................................... 100 63 537

(51) Int. Cl.$^7$ ......................... G01G 23/18; G01G 23/36; G01G 19/414
(52) U.S. Cl. ...................... 177/25.13; 177/177; 177/116
(58) Field of Search .............................. 141/83; 222/55, 222/56, 77; 177/25.11, 25.12, 25.13, 25.19, 70, 116, 177

(56) References Cited

U.S. PATENT DOCUMENTS

| | | | |
|---|---|---|---|
| 4,650,014 A | 3/1987 | Oldendorf et al. | ......... 177/177 |
| 5,460,209 A * | 10/1995 | Jandura et al. | ............... 141/83 |
| 5,847,328 A | 12/1998 | Oldendorf et al. | ....... 177/25.11 |
| 5,902,965 A | 5/1999 | Oldendorf et al. | ....... 177/25.11 |
| 6,191,371 B1 * | 2/2001 | Oldberg et al. | .......... 177/25.14 |

FOREIGN PATENT DOCUMENTS

| | | |
|---|---|---|
| DE | 3213015 C2 | 10/1983 |
| DE | 3638210 A1 | 5/1988 |
| DE | 4137919 C1 | 2/1993 |
| DE | G 92 03 846 | 8/1993 |
| DE | 198 51 351 A1 | 5/2000 |

* cited by examiner

*Primary Examiner*—Randy Gibson
(74) *Attorney, Agent, or Firm*—Sughrue Mion, PLLC

(57) ABSTRACT

A display and operating element (1) for an electronic scale with a display area (2, 3) in which the weighing results and values, parameters or selection lists can be displayed for user prompting either separated spatially or in succession over time, and having at least one button (6–8) for operating the scale. The display and operating element (1) has a rotary knob (4) on one side that turns in both directions to cause the values, parameters or marked areas of the selection list displayed in the display area (3) to change in one or the other direction. A button (5) is assigned to the rotary knob (4) as an acknowledgement button. Operation of this acknowledgement button (5) causes the value, parameter and marked area of the selection list selected using the rotary knob (4) to be accepted into the electronic evaluation unit of the scale. Accordingly, simple and fast setting of values and/or parameters and a fast selection of a specific item from a selection list can be achieved.

33 Claims, 7 Drawing Sheets

| PROCESS REQUEST |
| FIND FORMULA |
| STORE NEW FORMULA |

Fig. 2a

| PROCESS REQUEST |
| FIND FORMULA |
| STORE NEW FORMULA |

Fig. 2b

| PROCESS REQUEST |
| FIND FORMULA |
| STORE NEW FORMULA |

Fig. 2c

DISPLAY AND OPERATING ELEMENT FOR AN ELECTRONIC SCALE

This Application claims priority from German Application Number 100 63 537.7 which was filed on Dec. 20, 2000, the disclosure of which is incorporated into this application by reference.

FIELD OF AND BACKGROUND OF THE INVENTION

The invention relates to a display and operating element for an electronic scale having a display area in which the weighing results and values, parameters or selection lists for user prompting can be displayed, either spatially separated or in succession over time, and having at least one button for operating the scale.

Display and operating elements for scales of this type are generally known.

For example, German Patent DE 32 13 015 C2 describes a scale with an integrated display and operating element that has several programs and in which the individual program numbers are shown on the display in sequence when the scale is switched on so that the number of the desired program can be selected. Since this scale requires a delay to allow the operating personnel to decide whether to make a selection and react accordingly at each program number, sequencing through the program numbers can only be carried out slowly. As a result, program selection is very time-consuming.

In addition, a scale with a separate display and operating element is known from U.S. Pat. No. 4,650,014, in which a ten-key keypad is provided, e.g., for inputting a specified value. Therefore, numerical values can easily be input using this keypad. However, because of the ten-key keypad, the display and operating element is required to be relatively large, especially if the scale is designed to be operated while wearing protective gloves. If the system is further adapted to receive instructions by inputting letters as well as numerals, this would require approximately 30 additional keys, and thereby compound the problem.

In addition, it is also known from German Laid-Open Publication DE 36 38 210 A1 that an operating button of the scale—in this case the tare button—can be divided into several partial areas. For example, if the operating button is divided into four partial areas, it is possible to provide, e.g., a counting scale the permits selection between four different quantities or number of reference units by pressing the appropriate partial area. However, this method is useful for a selection of values only when there are at most a few values that can be selected.

Providing one button for incrementing and one button for decrementing in a measurement scale is also known from U.S. Pat. Nos. 5,847,328 and 5,902,965. These patents are incorporated by reference in their entirety into the present application. With these two buttons, at each actuation, the scale value can be increased or lowered by 1 and, thus, the displayed value can be brought to a specified value during an incorrect measurement. This method is good for small changes, but, for large changes, the button needs to be actuated a large number of times, which makes the procedure cumbersome.

Finally, mounting the weighing pan of a scale so that it can rotate and using the angle of rotation to adjust a parameter is known from German Patent No. DE 41 37 919 C1. However, this method is not useful for scales with a square scale pan or for scales with a conveyor device mounted on the scale pan to supply/remove the material to be weighed-for example, it is not at all possible with a roller conveyor. However, even during weighing with a round scale pan, the contact with the scale leads to a disturbance in the weighing result so that each time it is necessary to wait after a parameter change for the weighing result to settle to its rest value. As a result, changing parameters is time-consuming.

OBJECTS OF THE INVENTION

One object of the present invention is to provide an electronic scale having a display and operating element that makes possible the fast and simple adjustment of values/parameters and/or the selection of a specific point out of a selection list.

SUMMARY OF THE INVENTION

According to the invention, this and other objects are achieved by providing a rotary knob for the display element (for example, on one side of the display element), so that when the knob is turned in one direction or in the other, the values, parameters or marked areas of the selection list shown in the display area are changed in one direction or the other. Additionally, a button is assigned to the rotary knob as an acknowledgement button, such that actuation of this acknowledgement button results in the acceptance into the scale's electronic evaluation unit of the value, parameter or marked area of the selection list selected by using the rotary knob.

Because the selection is made by turning a rotary knob, both fast and accurate selection is rendered possible, so that even when there are many available alternatives—e.g., in the selection of letters—fast and precise selection remains possible. The selection is completed by actuating the acknowledgement button, and the selected alternative is accepted into the electronic evaluation unit and processed there.

In an advantageous aspect of the invention, the rotary knob is located on one side of the display and operating element and the acknowledgement button on the other side, so that one hand is free to operate the rotary knob without releasing it while the other hand can operate the acknowledgement button. In an alternative advantageous aspect of the invention, the acknowledgement button is integrated in the rotary knob. Either the acknowledgement button is installed in the rotary knob or the acknowledgement function is actuated by pressing the entire rotary knob. As a result, in this aspect of the invention, the turning (selection) and the pressing (acknowledgement) can be carried out with one hand. Accordingly, the present invention provides a scale in which its operation is simple, fast and reliable.

BRIEF DESCRIPTION OF THE DRAWINGS

The invention and further advantageous refinements of the invention according to the features of the claims are explained in more detail below with the aid of diagrammatic, exemplary embodiments in the drawings, which are not necessarily drawn to scale and in which:

FIGS. 2a–2c show the display area 3 from FIG. 1 with three possible display images.

DETAILED DESCRIPTION OF THE PREFERRED EMBODIMENTS

Figure 1:
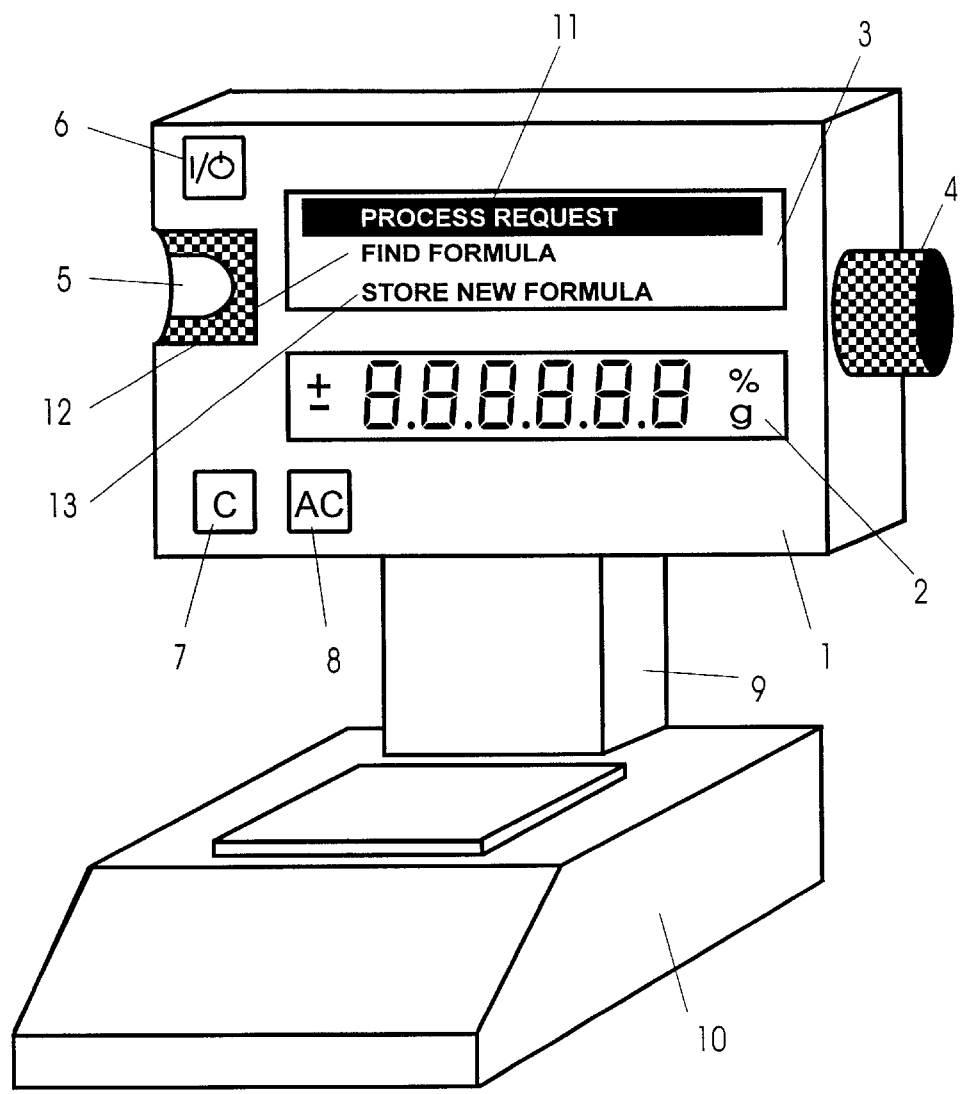
FIG. 1 shows a display and operating element (during menu selection) connected to a scale housing according to a first preferred embodiment of the invention.

The embodiments of the display and operating element 1 shown in FIGS. 1–10 have a display area or portion 2 for the display of a weighing result, a display area or portion 3 for user prompting, a rotary knob 4 on the right side, an associated acknowledgement button 5 on the left side, and other operating buttons 6–8 that serve, e.g., as an on/off switch, a tare button, a printer initiation, and buttons for other known functions. The entire display and operating element 1 is connected, in the example shown, by way of a support 9, to the scale housing 10. The entire display and operating element 1 can also be connected to the scale housing directly without the support 9, or indirectly in known ways. The rotary knob 4 and the acknowledgement button 5 are identified as belonging together by being made in the same color. In the figures, this is indicated by the shaded background. The way they are used together when the scale is operated will be explained using the following examples.

FIG. 1 shows the display and operating element displaying a basic menu used in the selection of functions of a color-mixing scale. Only display area 3 with its three possible display images is shown in FIGS. 2a–2c for explanation. A selection can be made between processing a request, searching for stored formulas, and storing a new formula. In FIGS. 1 and 2a, the top line 11 of this selection list is identified, i.e., is highlighted, by inverting the brightness. If the rotary knob 4 is turned, this inverse representation changes to the center line 12, as is shown in FIG. 2b. If rotary knob 4 is turned still further, the inverse representation moves to the lower line 13, as shown in FIG. 2c. From the status according to FIG. 2b, i.e., with center line 12 marked, by turning the rotary knob 4 in one direction, the user goes to the condition shown in FIGS. 1 and 2a, i.e., with top line 11 marked, and by turning the knob in the other direction to the condition shown in FIG. 2c, i.e., with the bottom line 13 marked.

Figure 3:
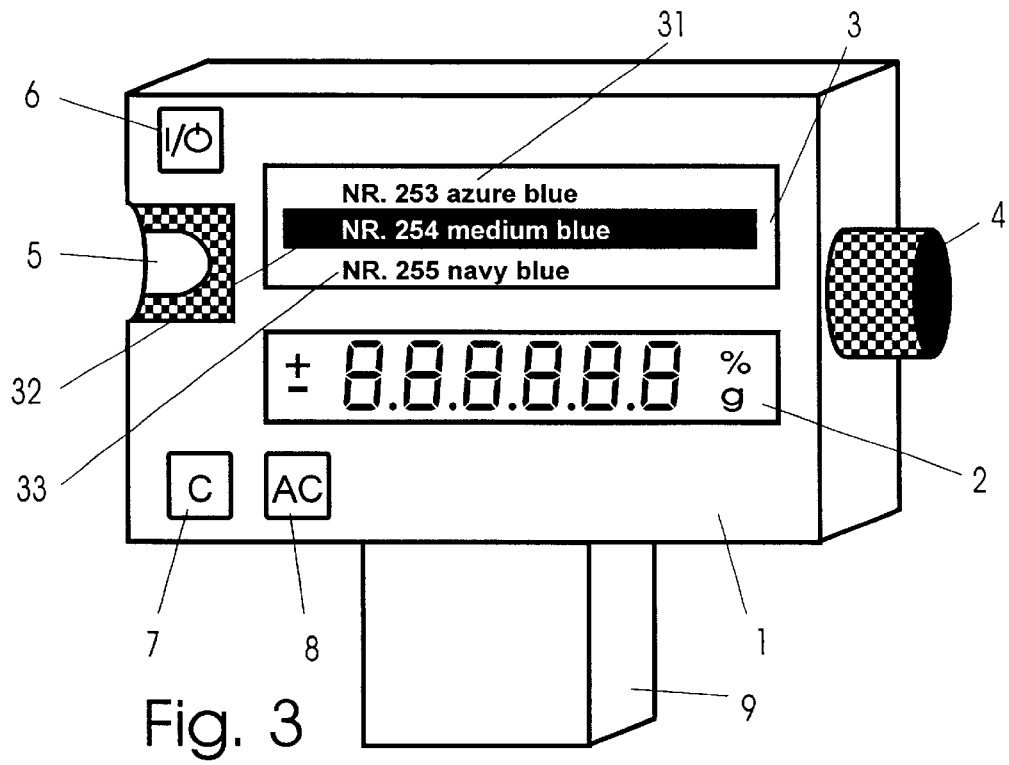
FIG. 3 shows the display and operating element during the selection of color formulas.

If the acknowledgement button 5 is pressed, for example, in the condition according to FIG. 2b, i.e., with the center line "FIND FORMULA" highlighted, this menu item is selected and will be accepted into the electronic evaluation unit in the scale and processed there. In the "FIND FORMULA" example, the list of formulas that have been stored and are available for selection will be displayed. This is shown in FIG. 3 for the example of the color-mixing scale. The various formulas are stored using an identification number and an explanatory color indicator. The illustrated embodiment allows three identification numbers to be displayed simultaneously. By turning rotary knob 4, e.g., downward, first formula No. 255 is marked with reverse representation. By turning further in the same direction, formula No. 256 is then displayed in the bottom line 33 and marked (in this process, formula No. 255 moves into center line 32 and formula No. 254 into top line 31). By further turning rotary knob 4, formula No. 257 is marked and displayed, etc. If rotary knob 4 is turned quickly, the change in formulas also occurs quickly so that it is also possible to "scroll through" a large number of formulas that are available for selection. When rotary knob 4 is turned in the opposite direction, the user "scrolls through" the formula numbers the same way in the opposite direction. If the desired formula is found in this way, it is selected by pressing the acknowledgement button 5. If acknowledgement button 5 is pressed while formula No. 254 is marked as shown in FIG. 3, this formula will be selected and accepted into the working memory of the electronic evaluation unit and can then be processed.

Figure 4:
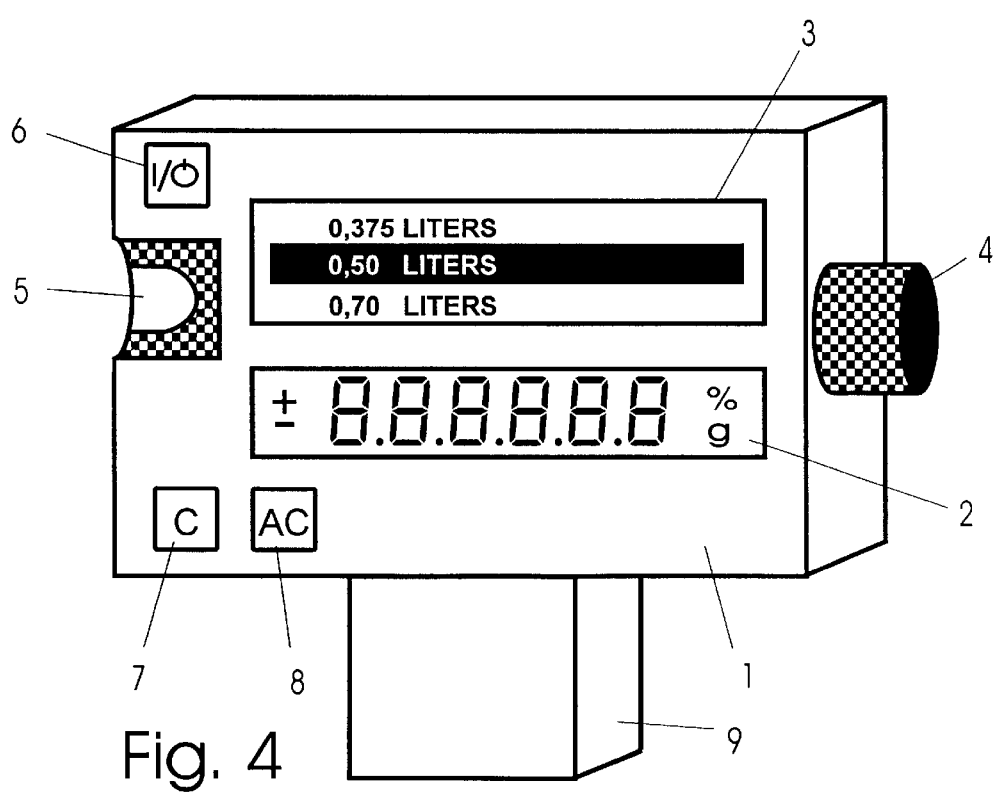
FIG. 4 shows the display and operating element during specification of the total quantity of a formula.

Before the individual components of the selected formula are dosed, for many color mixture scales, the desired total quantity can be specified. This specification is also possible in an advantageous manner with the display and operating element according to the present embodiment as shown in FIG. 4. It is possible to "scroll through" the various total quantities, again with rotary knob 4, and accept a selected quantity by pressing acknowledgement button 5. In the example of FIG. 4, the quantity of 0.5 liters is selected.

Figure 5:
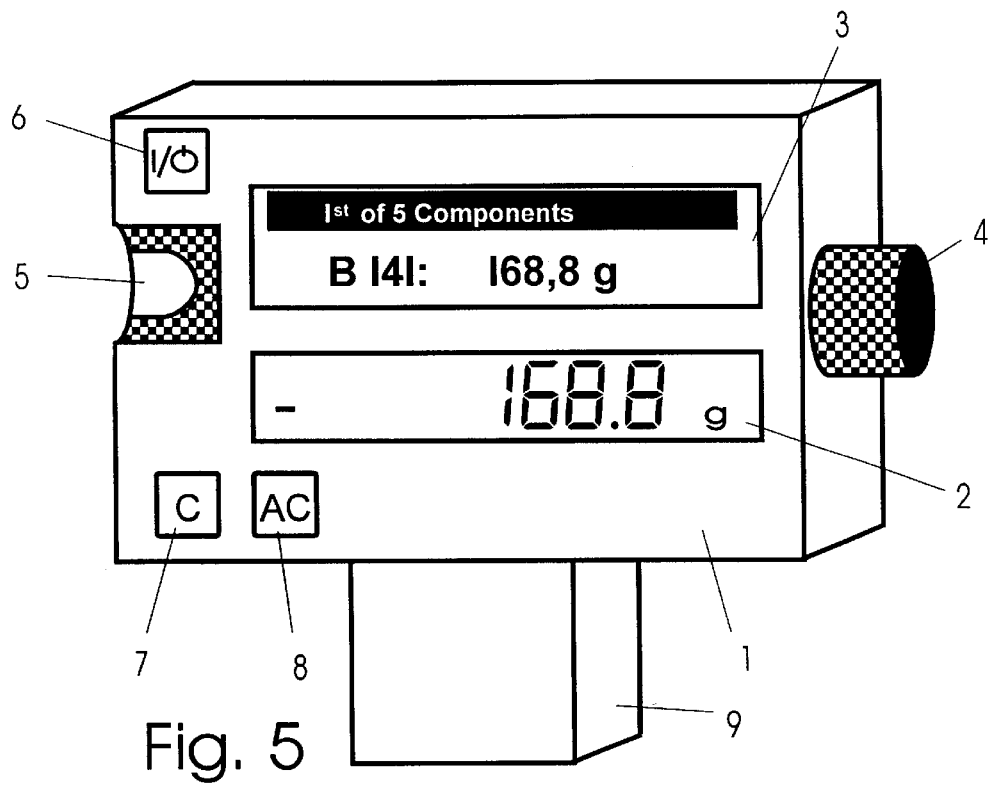
FIG. 5 shows the display and operating element during the dosing of one component of a formula.

Dosing of the first component of the accepted formula in the accepted total quantity is carried out with the displays shown in FIG. 5. Display field 3 indicates the component with its abbreviated form B141 and the specified quantity of 168.8 g. The specified quantity is also displayed at first in the display field 2, with a negative sign; during measurement this display changes according to the quantity dosed in and reaches the display value 0.0 g when the specified value has been reached. This method of dosing in toward zero is generally known and, therefore, does not need to be explained in detail here.

Figure 6:
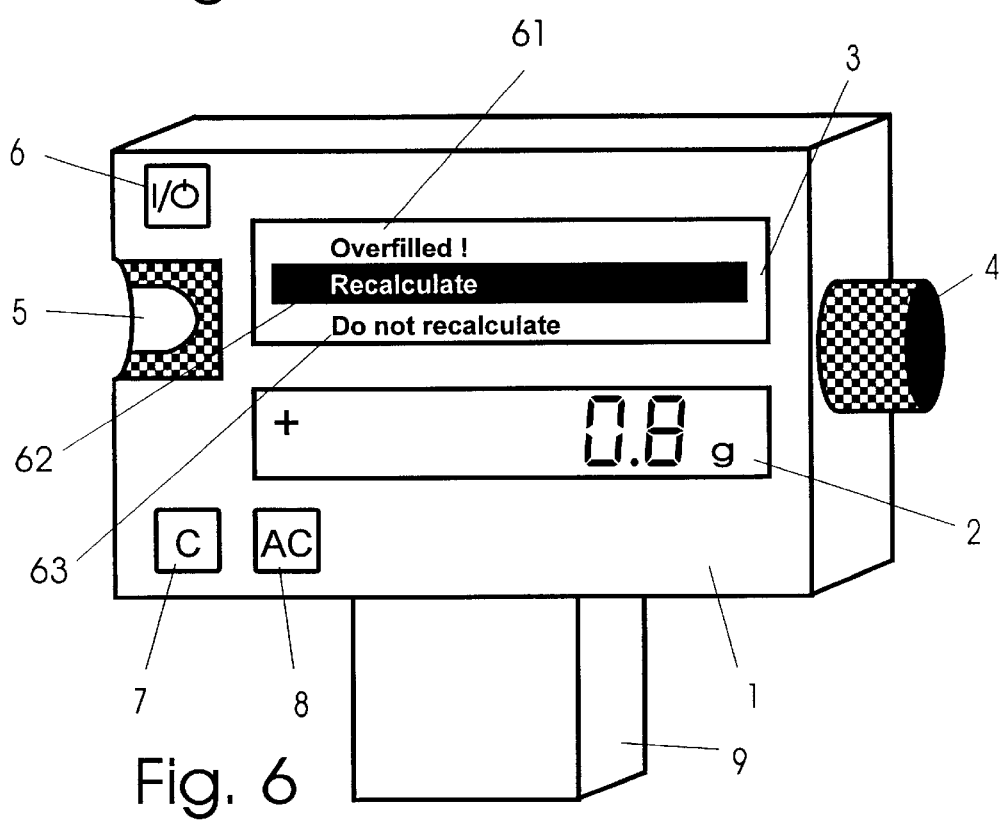
FIG. 6 shows the display and operating element in the case of overdosing or overfilling.

FIG. 6 shows the case of an overdosing or overfilling by 0.8 g as an example. In display unit 3, at first the fact of overfilling is displayed in top line 61. Below this, a decision by the user is requested in lines 62 and 63 of whether a recalculation should be carried out or not. This decision is made again by turning the rotary knob 4 and actuating acknowledgement button 5. In the example shown, "RECALCULATION" is set and can be input or accepted by pressing acknowledgement button 5. The scale's electronic evaluation unit then accepts the overfilling of 0.8 g, calculates the quantities to be added in for the components that were already dosed in, and displays these (as shown in FIG. 5 but with the note "RECALCULATION").

Figure 7:
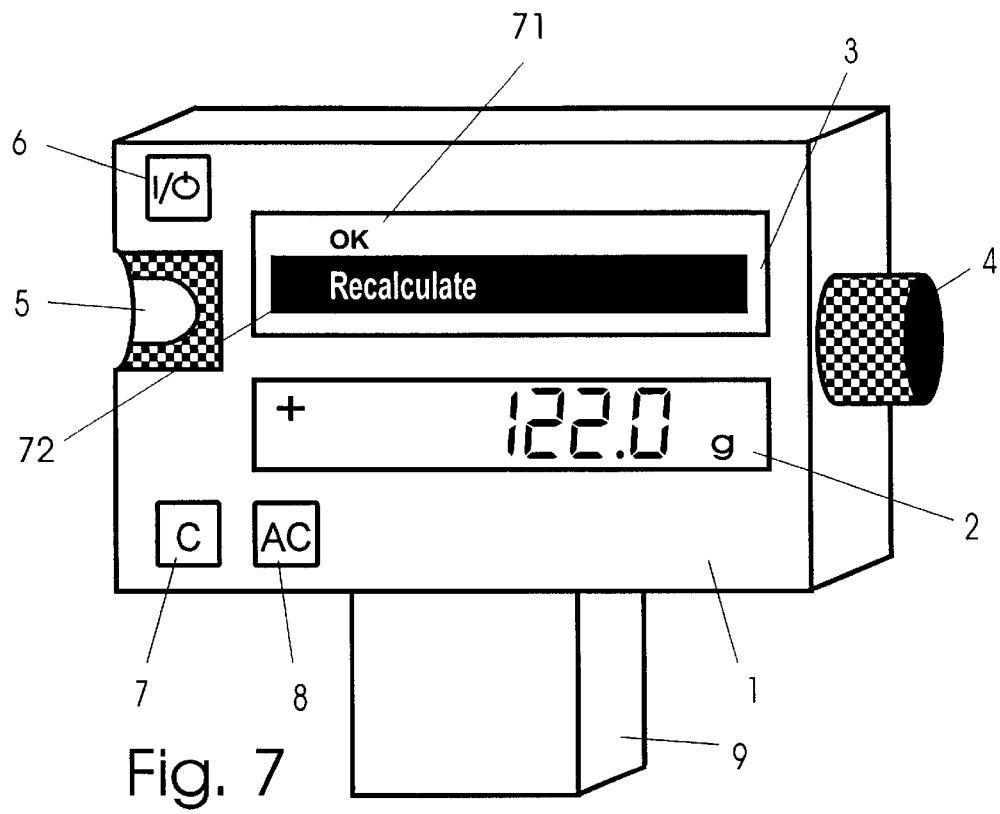
FIG. 7 shows the display and operating element in the case of overdosing in a color-mixing scale without formula memory.

However, the display and operating element according to the invention can also be advantageously used in color-mixing scales without a formula memory installed, as known from U.S. Pat. No. 5,847,328 that has already been mentioned above. In these scales, the specified amounts for the individual components are not stored in the scale or in a connected data processor, but rather, the user works directly, e.g., from a paper document. Assignment of the specified value with a negative sign, as shown in FIG. 5, is thus not possible and/or would have to be input manually first. Therefore, in these scales, the dosing starts from 0.0 g and goes to the specified value. If a scale value of 122.0 g is then reached, as shown in FIG. 7 in display area 2, and this value is the correct specified value, line 71 "OK" is selected by turning rotary knob 4 and pressing the acknowledgement button 5, thus, inputting the correct value. However, if the desired value is, e.g., 121.0 g, the component is overdosed by 1.0 g. Then "RECALCULATION" is selected in display area 3 by turning rotary knob 4, as shown, and the recalculation is initiated by pressing the acknowledgement button 5. During the recalculation, the scale result of 122.0 g is first accepted in display area 3, reset to 121.0 g by turning rotary knob 4, and this value is sent to the electronic evaluation unit as the correct specified value by pressing acknowledgement button 5. The evaluation unit then calculates the overfilling by comparing of the specified value in display area 3 to the actual value in display area 2, and from this the necessary re-measurement of the components that have already been added and the necessary adjustments for the other components of the formula can be determined. Reference is made to the incorporated U.S. Pat. No. 5,847,328, mentioned above, with regard to the details of this correction procedure.

Figure 8:
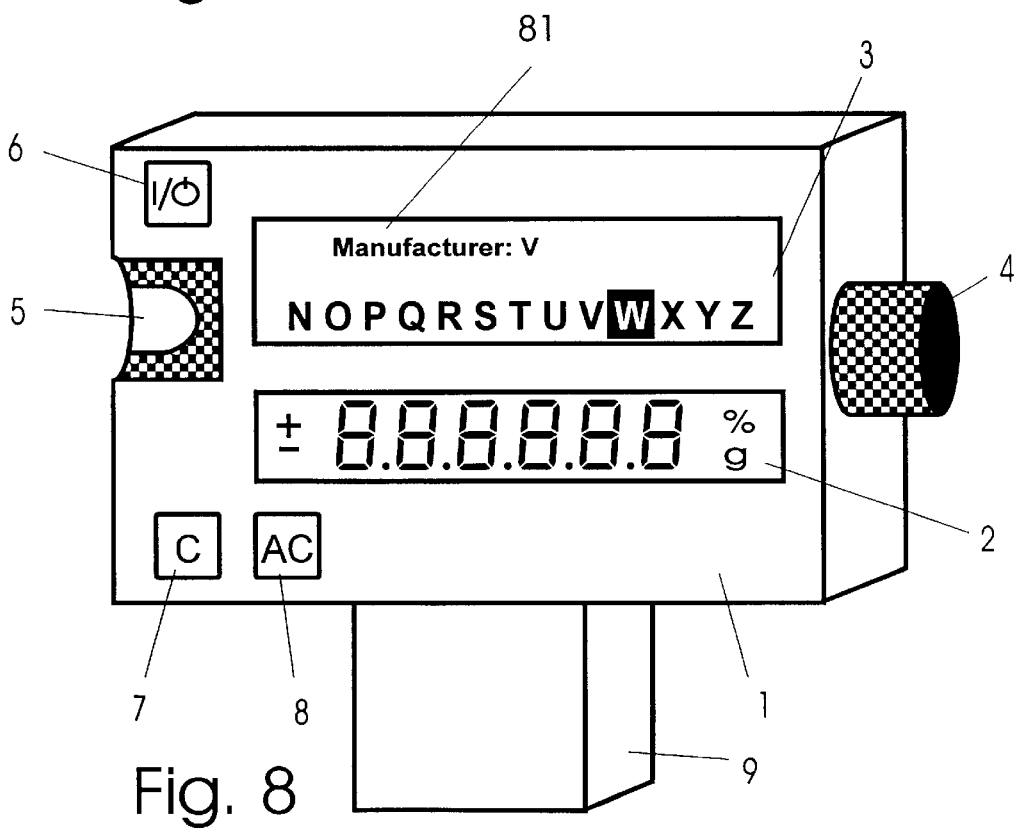
FIG. 8 shows the display and operating element during the selection of letters in formula storing.

The display and operating element is also useful in storing new formulas in a scale with formula memory. FIG. 8 shows the selection of letters. The correct letter is selected by turning the rotary knob 4. In this process, the series of letters displayed shifts automatically, as soon as the letter N is reached and the rotary knob continues to be turned in the same direction. If the acknowledgement button 5 is pressed with the display status according to FIG. 8, the selected letter W will be accepted into the upper line 81 of the upper display area 3 and added after the letter V. Selection of other letters then occurs in the same manner.

Figure 9:
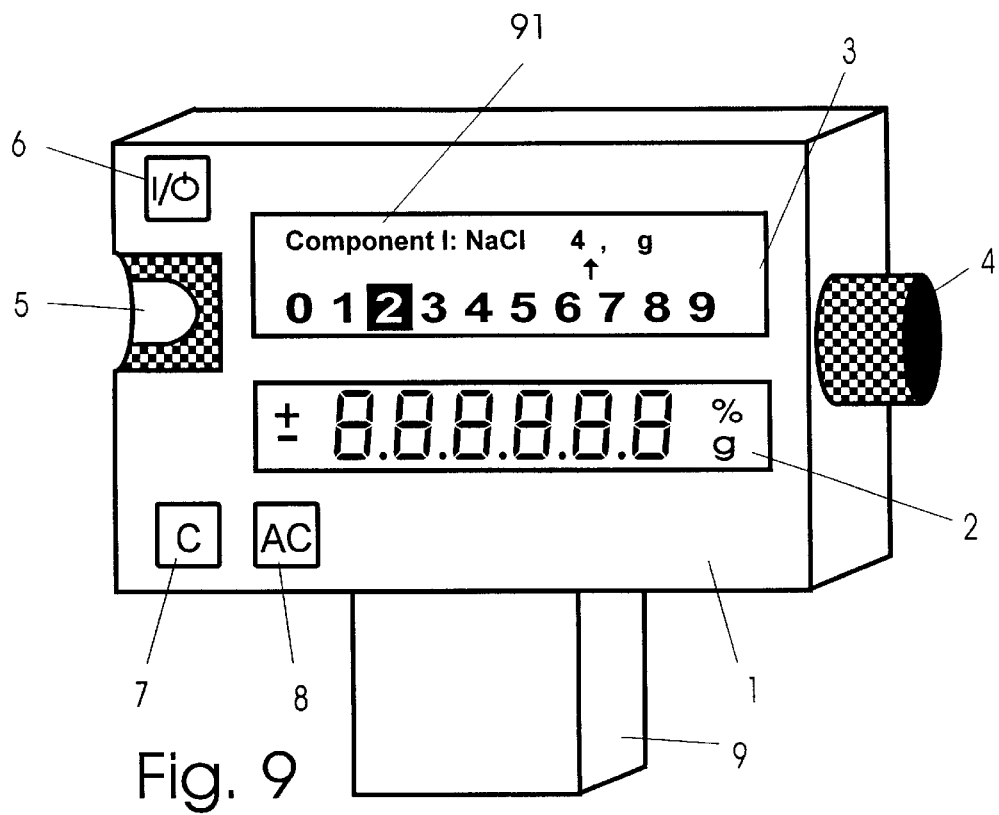
FIG. 9 shows the display and operating element during the selection of numbers for quantity specification of the components during formula storing.

FIG. 9 shows the input of the specified value of a component in a corresponding manner. If acknowledgement button 5 is pressed with the display status according to FIG. 9, the selected number 2 is accepted in the top line 91 the of display area 3 in the one's place. Then the next number will be selected by turning the rotary knob 4 and the first place after the decimal will be accepted by pressing the acknowledgement button 5. For round values, e.g., 100.0 g, the successive zeroes can then be taken over very quickly by pressing acknowledgement button 5 several times.

Figure 10:
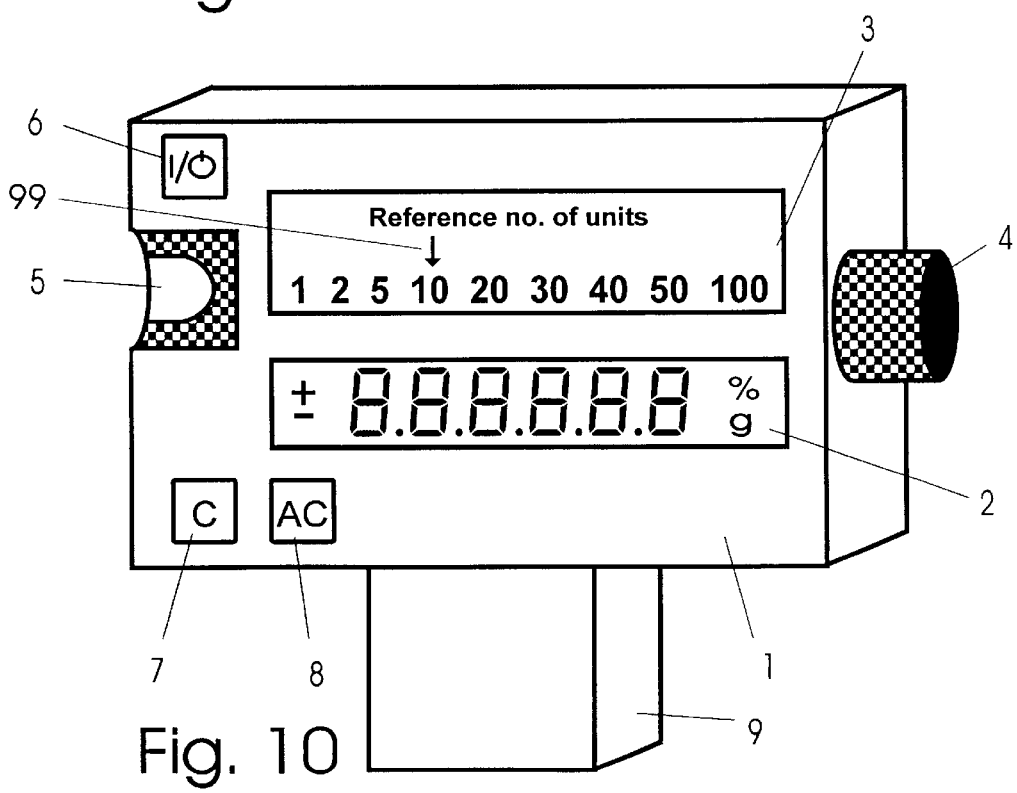
FIG. 10 shows the display and operating element during an operation specifying the desired number of units for a counting scale.

FIG. 10 shows the selection of the desired quantity of items for a counting scale. The number selected by turning rotary knob 4 is not indicated by an inverse representation in this example, but rather by an arrow 99. When rotary knob 4 is turned, this arrow moves to the left or the right depending on the direction of rotation. Acceptance into the electronic evaluation unit of the scale again is carried out by pressing acknowledgement button 5.

The examples described above for advantageous use of a rotary knob as an adjustment/selection element and an associated acknowledgement button for scales are naturally only representative of the possible application areas. Further examples, like the selection of various baud rates, the setting of standstill parameters, the selection of various dimensional units, the selection of the random sample size during final packaging inspections, input of article numbers, specification and feedback of identification numbers in repeat weighing, parameter specification in the scope of a personal menu, etc., can easily be added.

Figure 11:
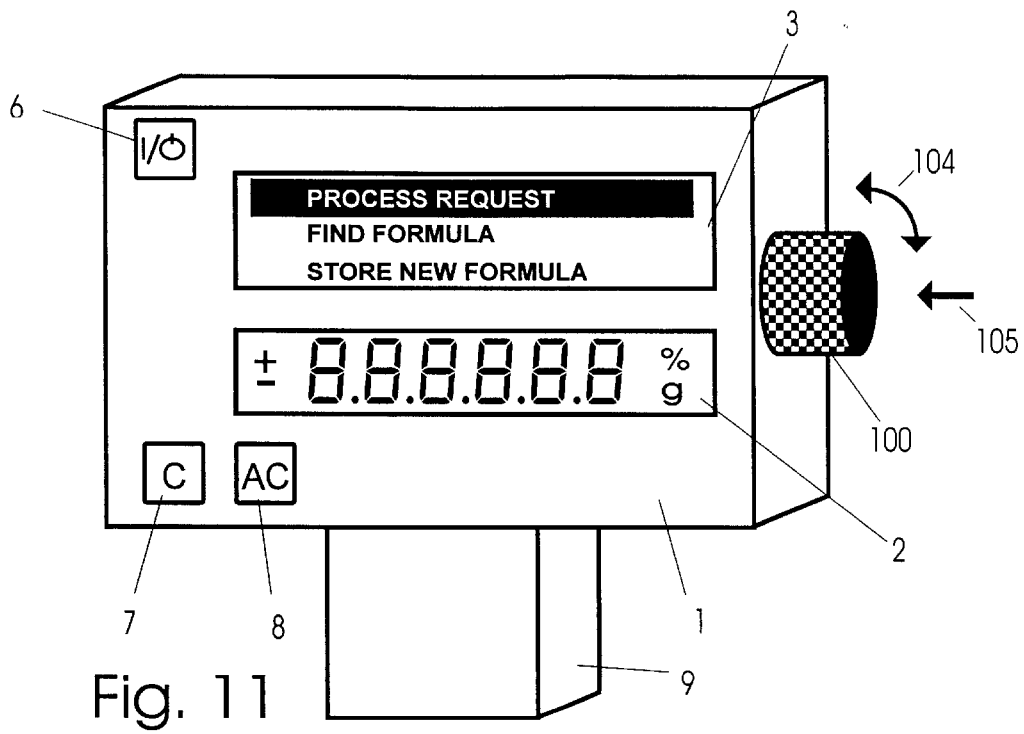
FIG. 11 shows an alternative design of the display and operating element according to a second preferred embodiment of the invention.
Figure 12:
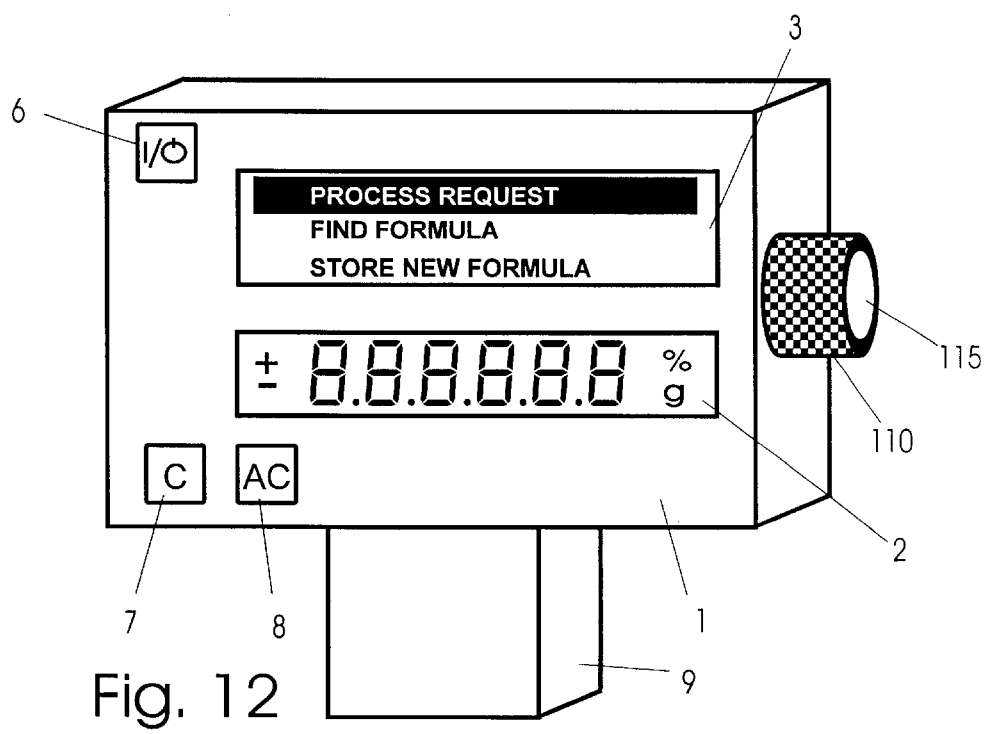
FIG. 12 shows another alternative design of the display and operating element according to a third preferred embodiment of the invention.

In the preceding, rotary knob 4 and acknowledgement button 5 have always been shown as separate components. However, it is possible to combine the functionality of both into one module. This is shown by way of example in FIGS. 11 and 12. In FIG. 11, rotary knob 100 can be turned and pressed in axially as is indicated by arrows 104 and 105. After the rotary knob is turned, a separate acknowledgement button will not be actuated, rather the rotary knob is pressed in and the acknowledgement signal is thus generated. Because of this, the selection and acceptance procedure can be accomplished with one hand. The procedure is otherwise preferably identical to the examples above. In FIG. 12, the acknowledgement button 115 is integrated into the side surface of the rotary knob 110. Again, one-hand operation is possible.

The above description of the preferred embodiments has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A display and operating element for an electronic scale, comprising:

a display area in which user prompted information is displayed spatially separated or in succession over time;

a rotary knob operable to be turned to make a selection from the user prompted information, wherein the turning of the rotary knob causes the user prompted information to change; and an acknowledgement button associated with the rotary knob and spatially separated from the rotary knob, the acknowledgement button operable to cause selected user prompted information currently displayed in the display area to be accepted by the scale.

2. The display and operating element according to claim 1, wherein the rotary knob is mounted on a first side of the display and operating element and the acknowledgement button is mounted on a second side of the display and operating element that is opposite the first side.

3. The display and operating element according to claim 2, wherein the rotary knob is mounted on a right side of the display and operating element when viewed from a front of the display and operating element, and the acknowledgement button is mounted on a left side of the display and operating element when viewed from the front of the display and operating element.

4. The display and operating element according to claim 2, wherein the rotary knob and the acknowledgement button are the same color.

5. The display and operating element according to claim 1, wherein the user prompted information is arranged in a plurality of lines, one below the other, in the display area.

6. The display and operating element according to claim 1, wherein the user prompted information is arranged sequentially in a plurality of spaces, one laterally next to the other, in the display area.

7. The display and operating element according to claim 1, wherein marking of the user prompted information for selection is represented by a differing color or an inversion of brightness.

8. The display and operating element according to claim 1, wherein marking of the user prompted information for selection is indicated by a movable arrow.

9. The display and operating element according to claim 1, wherein a speed of change of the user prompted information in the display area is substantially proportional to a speed of rotation of the rotary knob.

10. The display and operating element according to claim 1, wherein the rotary knob is operable to be turned freely without stops.

11. The display and operating element according to claim 1, wherein the display and operating element is operable for use with a color mixing scale.

12. The display and operating element according to claim 1, wherein the display and operating element is operable for use with a mixing scale for mixing a plurality of components according to a formula, and wherein the mixing scale offers an option for recalculation of a weight value for at least one of the plurality of components based on the formula.

13. The display and operating element according to claim 12, wherein the rotary knob is operable to increment and decrement a displayed scale result during recalculation.

14. The display and operating element according to claim 11, wherein the color mixing scale offers an option for selecting a total quantity of a formula, and wherein the rotary knob and the acknowledgement button are operable to select this total quantity.

15. The display and operating element according to claim 5, wherein turning of the rotary knob in one direction causes the user prompted information to scroll up in the display area, and turning of the rotary knob in an opposite direction causes the user prompted information to scroll down in the display area.

16. The display and operating element according to claim 6, wherein turning of the rotary knob in one direction causes the user prompted information to scroll right in the display area, and turning of the rotary knob in an opposite direction causes the user prompted information to scroll left in the display area.

17. The display and operating element according to claim 12, wherein the option for recalculation of a weight value for a component is selected to adjust a quantity of a previously added component as a result of an overfill of a quantity of a presently added component, and wherein the rotary knob and acknowledgment button are operated to confirm an overfill value appearing on the display and operating element for the presently added component.

18. The display and operating element according to claim 17, wherein the rotary knob and acknowledgment button are operated to decrement the overfill value by the overfill quantity.

19. The display and operating element according to claim 12, wherein the option for recalculation of a weight value for a component is selected to adjust a quantity of a component to be subsequently added as a result of an overfill of a quantity of a presently added component, and wherein the rotary knob and acknowledgment button are operated to confirm an overfill value appearing on the display and operating element for the presently added component.

20. The display and operating element according to claim 19, wherein the rotary knob and acknowledgment button are operated to decrement the overfill value by the overfill quantity.

21. The display and operating element according to claim 1, wherein the user prompted information includes weight results and operating modes and parameters of the scale.

22. The display and operating element according to claim 1, further comprising at least one additional button for operating the scale.

23. The display and operating element according to claim 1, wherein the acknowledgement button is operable to cause selected user prompted information currently displayed in the display area to be accepted and processed by the scale.

24. An electronic scale for mixing a plurality of components according to a formula, comprising:
   a scale housing;
   a weighing container, which receives the components to be mixed, disposed on the scale housing;
   an electronic evaluation unit, including a recalculation mode for recalculation of a weight value for a component in the formula based on an overfill of another component in the formula;
   a display and operating element connected to the housing and having a display area in which user prompted information is displayed;
   a rotary knob operable to be turned in both directions to make a selection from the user prompted information, wherein the turning of the rotary knob causes the user prompted information to change; and
   an acknowledgement button associated with the rotary knob and spatially separated from the rotary knob, the acknowledgement button operable to cause selected user prompted information currently displayed in the display area to be accepted by the scale.

25. The electronic scale according to claim 24, wherein the recalculation mode is selected by operating the rotary knob, and wherein the recalculation mode calculates a required adjustment to a quantity of a previously added component as a result of an overfill of a quantity of a presently added component, and wherein the rotary knob and acknowledgment button are operated to confirm an overfill value appearing on the display and operating element for the presently added component.

26. The electronic scale according to claim 25, wherein the rotary knob and acknowledgment button are operated to decrement the overfill value by the overfill quantity.

27. The electronic scale according to claim 27, wherein the recalculation mode calculates the required adjustment to the quantity of the previously added component based on the overfill quantity of the presently added component as determined by the operation of the rotary knob and acknowledgment button to decrement the overfill value by the overfill quantity.

28. The electronic scale according to claim 24, wherein the recalculation mode is selected by operating the rotary knob, and wherein the recalculation mode calculates a required adjustment to a quantity of a component to be subsequently added as a result of an overfill of a quantity of a presently added component, and wherein the rotary knob and acknowledgment button are operated to confirm an overfill value appearing on the display and operating element for the presently added component.

29. The electronic scale according to claim 28, wherein the rotary knob and acknowledgment button are operated to decrement the overfill value by the overfill quantity.

30. The electronic scale according to claim 29, wherein the recalculation mode calculates the required adjustment to the quantity of the component to be subsequently added based on the overfill quantity of the presently added component as determined by the operation of the rotary knob and acknowledgment button to decrement the overfill value by the overfill quantity.

31. The electronic scale according to claim 24, wherein the scale further comprises an electronic memory, and wherein the rotary knob and acknowledgement button are operable to store a new mixing formula in the electronic memory by turning the rotary knob to scroll through and select letters and numbers that define the new mixing formula and operating the acknowledgment button to accept the selected letters and numbers.

32. The electronic scale according to claim 24, wherein the user prompted information includes weight results and operating modes and parameters of the scale.

33. The electronic scale according to claim 24, wherein the acknowledgement button is operable to cause selected user prompted information currently displayed in the display area to be accepted and processed by the scale.

* * * * *